US011574317B2

(12) United States Patent
Carroll et al.

(10) Patent No.: US 11,574,317 B2
(45) Date of Patent: Feb. 7, 2023

(54) INMATE COMPLIANCE MONITOR

(71) Applicant: Codex Corporation, Maple Grove, MN (US)

(72) Inventors: Michael Carroll, Woodbury, MN (US); Andrew Shaw, Maple Grove, MN (US); Gareth Miller, Roseville, MN (US); Frank Montemorano, St. Michael, MN (US); Kenneth L. Dalley, Jr., Maple Grove, MN (US); Benjamin Drong, Otsego, MN (US)

(73) Assignee: Codex Corporation, Maple Grove, MN (US)

( * ) Notice: Subject to any disclaimer, the term of this patent is extended or adjusted under 35 U.S.C. 154(b) by 277 days.

(21) Appl. No.: 16/902,600

(22) Filed: Jun. 16, 2020

(65) Prior Publication Data

US 2021/0390554 A1 Dec. 16, 2021

(51) Int. Cl.
  *G06Q 30/00* (2012.01)
  *G06K 7/10* (2006.01)
  *G06K 19/07* (2006.01)
  *G08B 21/24* (2006.01)

(52) U.S. Cl.
  CPC ....... *G06Q 30/018* (2013.01); *G06K 7/10366* (2013.01); *G06K 19/0723* (2013.01); *G08B 21/24* (2013.01)

(58) Field of Classification Search
  CPC ............. G06Q 30/018; G06K 7/10366; G06K 19/0723; G08B 21/24

USPC ......................................................... 705/317
See application file for complete search history.

(56) References Cited

U.S. PATENT DOCUMENTS

| 9,922,366 | B1* | 3/2018 | Hodge | G06Q 10/087 |
| 2002/0180603 | A1* | 12/2002 | Lyle | G08B 13/2462 340/572.1 |
| 2010/0039247 | A1* | 2/2010 | Ziegler | G07C 5/08 340/436 |
| 2012/0053957 | A1* | 3/2012 | Atkins | G16H 50/30 705/2 |

* cited by examiner

*Primary Examiner* — Inder P Mehra
(74) *Attorney, Agent, or Firm* — Schwegman Lundberg & Woessner, P.A.

(57) ABSTRACT

The disclosure relates to systems and methods for compliance monitoring in a secure facility. A method can include generating, by a mobile radio frequency identification (RFID) device, data regarding a proximate stationary RFID device of stationary RFID devices situated about a correctional facility, the mobile RFID device associated with a user, and comparing, by a server, the generated data to compliance monitoring rules that govern actions to be performed by the personnel in monitoring offender behavior, each of the compliance monitoring rules including an associated timeframe in which an action of the compliance monitoring rule is to be performed, and generating, by the server, an alert to be provided to the mobile RFID device in response to determining a time associated with a compliance monitoring action has already expired or will expire in a specified amount of time.

18 Claims, 12 Drawing Sheets

| LOCATION 304 | TIME BETWEEN ACTIONS 322 (min.) | TIME LEFT 316 min:secs |
|---|---|---|
| LOCATION 1 | 15 | 2:10 |
| LOCATION 2 | 15 | 2:10 |
| LOCATION 3 | 120 | 2:02 |
| LOCATION 4 | 30 | 2:37 |
| LOCATION 5 | 60 | 3:16 |
| LOCATION 6 | 30 | 3:42 |
| LOCATION 7 | 30 | 3:42 |

JUSTIFICATION

VIOLATION ID

660

662 SAVE

664 CLEAR

CANCEL

600

COMPLIANCE MONITOR ALERT

NEXT CHECK DUE

LOCATION

TIME DUE

ACKNOWLEDGE — 880

882

FILTER [ LOCATION ▽ ] — 884

OPTIONS — 886

| LOCATION | MAX TIME | LAST CHECK | NEXT CHECK | TIME LEFT |
|----------|----------|------------|------------|-----------|
|          |          |            |            |           |
|          |          |            |            |           |
|          |          |            |            |           |

INMATE COMPLIANCE MONITOR

BACKGROUND INFORMATION

Officers at secure facilities face many challenges in complying with requirements imposed on the secure facility. Some of the difficulty comes with documenting when a compliance check is made. Some of the difficulty comes with keeping track of when to make a compliance check.

Such a compliance check can include visual inspection and verification on a strict schedule. Such a compliance check can require the officers to have a detailed knowledge of which inmates can associate with each other, and which areas of a premises the individual inmates are permitted to occupy.

BRIEF DESCRIPTION OF THE DRAWINGS

FIG. 4 illustrates a diagram of another embodiment of a user interface, according to an example embodiment.

FIG. 6 illustrates a diagram of another embodiment of another user interface, according to an example embodiment.

FIG. 8 illustrates a diagram of an embodiment of a user interface through which the personnel can manage information provided in response to selecting the compliance monitor notification or the security check software control, according to an example embodiment.

DETAILED DESCRIPTION

Figure 1:
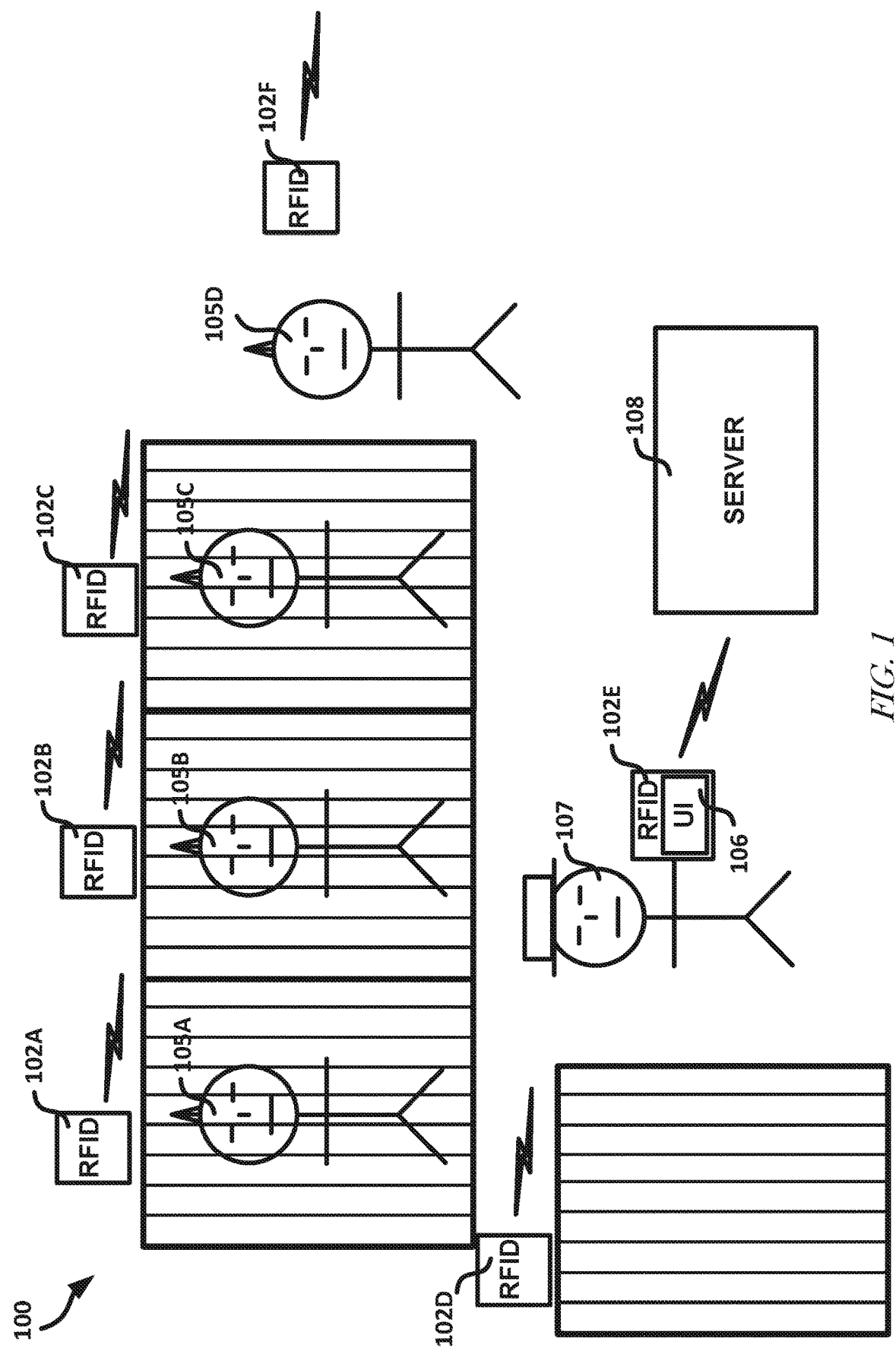
FIG. 1 illustrates a networked system configured for secure facility personnel compliance monitoring, according to an example embodiment.

Various embodiments illustrated and described herein provide solutions to efficiently and accurately monitor a compliance check (e.g., a face-to-face check, a wellness check, cell check, security rounds, or the like) performed by personnel of a secure facility. These embodiments provide one or more advantages over prior correctional facility personnel monitoring systems. The one or more advantages can include removing the requirement of the correctional facility personnel to manually set a timer to remind them when to do a compliance check, or randomizing a time to remind the personnel when to perform the compliance check, such as to keep an inmate from getting used to a routine of the personnel, among others. These advantages and embodiments are described, with reference to the FIGS.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the subject matter of embodiments.

Such embodiments may be referred to, individually and/or collectively, herein by the term example or embodiment merely for convenience and without intending to limit the scope of this application to any single concept if more than one is in fact disclosed. The following description is, therefore, not to be taken in a limited sense, and the scope of inventive subject matter is defined by the appended claims.

The disclosure presents methods and apparatuses for inmate compliance monitoring. The correctional facility personnel can include an employee of the correctional facility (e.g., a corrections officer, warden, cook, nurse, janitor, maintenance personnel, information technology (IT) manager, maid, or the like), a person detained in the correctional facility (sometimes called an "inmate" or "offender" herein), a person visiting the correctional facility (e.g., inmate friend or relative), lawyer, religious figure (e.g., minister, pastor, rabbi, or the like), or other correctional facility visitor.

Secure facility agencies face logistical, communication, and records management challenges when managing offenders (e.g., incarcerated persons). This includes offender processing, ensuring the offenders are in a particular location within a specified period of time, providing care, feeding, and collecting a wide range of information about each of the offenders. Various embodiments illustrated and described herein include systems, methods, and software to assist in such situations. For example, typical embodiments assist in rapid recording and monitoring a wide range of data about including whether secure facility personnel have performed a required operation on the offender, such as feeding, checking offender location, or the like. One or more embodiments may do so in a user-friendly and efficient manner via a networked computing environment.

Custodians of persons in a secure facility manage many responsibilities including a significant amount of documentation. The documentation can capture data pertinent to each person for which they are responsible. Custodians (e.g., secure facility officers) may face challenges in complying with state, county, city, national, or personal requirements imposed on them. To help mitigate risks associated with non-compliance and to help improve a compliance rate or reduce a non-compliance rate, some embodiments herein include systems, methods, and software that provide automated data documentation and alerting to remind the custodians to perform a compliance check.

Not all compliance checks have static requirements. For example, an inmate can be a part of a general cell check, which requires a compliance check every sixty minutes. Then, the inmate can become injured or otherwise need a well-being check that is required every 30 minutes. The officer in charge of monitoring that inmate or performing that check, may not be aware of the change in status of the inmate. Embodiments can provide a capability to alert the officer in charge of monitoring of when a status of an inmate has changed. Embodiments can help the officer comply with the compliance check even with the change in the status of the inmate. Note that a status can change from general to medical, special, or the like. A special status includes preservation for litigation, suicide watch, or the like. A medical status is one that includes a monitoring of the inmate for medical reasons.

These and other advantages can be realized using one or more embodiments disclosed herein. The systems, methods, devices, and machine-readable media are now described in more detail with reference to the drawings. In the FIGS., like numerals with different suffixes indicate different instances of a similar item. For example, 102A can refer to a specific instance of the RFID TX/RX 102 and 102B refers to a different instance of the RFID TX/RX 102.

FIG. 1 illustrates a networked system 100 configured for secure facility personnel compliance monitoring, according to an example embodiment. The system 100 can include one or more RFID transmitters, receivers, or a combination thereof 102A-102F (hereafter RFID TX/RX) or a server 108.

The RFID TX/RX 102A-102F can be mobile (e.g., hand-held) or fixed in the area in which they are deployed. In the example shown in FIG. 1, RFID TX/RX 102A-102D and 102F are fixed, while RFID TX/RX 102E is mobile. The RFID TX/RX 102A-102F can be assigned a name (e.g., a collection of characters, letters, numbers, or other symbols) to uniquely identify the RFID TX/RX 102. The RFID TX/RX 102A-102F can each be assigned to a specific location. The RFID TX/RX's location can be configured such that the RFID TX/RX 102A-102F, in aggregate, can monitor a substantial portion of the premises in which they are deployed for the presence of a corresponding mobile RFID TX/RX 102A-102F. The location of an RFID TX/RX 102 can be determined through global positioning systems (GPS) software on the RFID TX/RX 102, a location code stored in a database (e.g., database 214 of FIG. 2 or other computer memory), or other location to allow software services to verify the location of the RFID TX/RX 102. In one or more embodiments, the RFID TX/RX 102A-F can be configured to detect a corresponding mobile RFID TX/RX 102A-F located within a specific range of the RFID TX/RX 102A-102F. In such embodiments, the RFID TX/RX 102 can send an interrogating signal to a mobile RFID TX/RX 102 (or vice versa) and receive an identifying signal in response to the RFID TX/RX 102 receiving the interrogating signal. The identifying signal can include a unique identifier (e.g., a specific frequency, signal shape, or other unique identifier) corresponding to that RFID TX/RX 102. The RFID TX/RX 102 can be internal or external to a building on the premises in which the system 100 is deployed. For example, RFID TX/RX 102A-D can be internal to a detention center building, RFID TX/RX 102E can be either internal or external to the detention center building, and RFID TX/RX 102F can be external to the detention center building, such as in a courtyard or a recreation area.

The RFID TX/RX 102A-102F can each be assigned to a specific customer (e.g., an entity interested in using a secure facility compliance monitoring system). Such an assignment can help a data center manage information received from the RFID TX/RX 102 (note: "102" is used to refer to RFID TX/RX in general). The RFID TX/RX 102A-F can be connected to a server 108 or a network 213 (see FIG. 2) through a wired or wireless connection (indicated by a lightning bolt in FIG. 1). A wired connection can include an Ethernet connection or other protocol operable to connect the RFID TX/RX 102A-102F to the server or network. A wireless connection can include WiFi, Bluetooth, Zigbee, or other protocol operable to wirelessly connect the RFID TX/RX 102A-102F to the server 108 or network 213.

An RFID TX/RX 102A-102F can be associated with one or more compliance monitor events 220. A compliance monitor event 220 can include an offender checkup, location verification, offender feeding, offender healthcare, or other event. For example, the RFID TX/RX 102A-102F can be used to perform a scan at a particular time. The results of the scan can be sent to the server 108. The results retrieved can be compared to a list of expected results. If the comparison shows an irregularity or a deviation from what is expected, a warning or alert can be sent to the proper personnel (e.g., one or more custodians responsible for managing the person associated with deviation). The proper personnel can then respond to the situation. In the case of a detention center, a warning can be sent to a detention facility personnel 107 in charge of the offender 105 corresponding to the deviation. The system can enable one or more RFID TX/RX 102 to perform one or more pre-programmed compliance monitor events 220 (see FIG. 2), such as simultaneously or on a scheduled or non-scheduled basis. The compliance monitor events 220 can enable the RFID TX/RX 102 and the system to be flexible in implementing or at least partially automating a wide range of personnel compliance monitoring services, such as monitoring the movement of offenders 105 (note that "105" is used to refer to offenders generally). The compliance monitor events can allow an RFID TX/RX 102 to help perform multiple tasks simultaneously.

One or more user defined compliance monitoring rules 222 (see FIG. 2) can be assigned to a compliance monitor event 220. User defined compliance monitoring rules 222 can include offender checkup schedules, feeding healthcare or the like. The compliance monitoring rules 222 can include personnel authorized or with sufficient training to comply, an offender identification associated with the compliance rule, an expected location of the offender 105, a time the compliance action is due, an amount of time until the compliance action is due, an indication of whether the compliance is overdue, or the like.

A monitoring rule can be defined that requires the RFID TX/RX 102 of personnel 107 to be scanned by another RFID TX/RX 102 within a specified period of time. An alert can be created if the RFID TX/RX 102 does not detect the RFID TX/RX 102 within the specified period of time. An alert can be created if the RFID TX/RX 102 and corresponding personnel input is not detected within the compliance monitor rules.

Compliance monitoring can occur through a user verifying, such as by manually entering into the system, that the offender 105 was located where they were expected. Such manual validation can include entering a unique ID of the offender 105, the personnel 107, or the like. The web application can record data pertinent to location (e.g., a preprogrammed database code, a computer name through which data was entered, an Internet Protocol (IP) address associated with the computer, or the like) with a validation performed by a user.

A user can define an arrival time or a return time for a scheduled or non-scheduled movement of an offender 105. An arrival time can define a specified period of time in which personnel should authenticate their arrival by having an RFID TX/RX scanned by another RFID TX/RX 102 at or near their destination, such as to not trigger an alert. A return time can define a specified period of time within which an offender 105 should have their location verified.

A user (e.g., a system administrator) can define or allow scheduled or non-scheduled offender movement to not trigger an alert. This allowance can be granted on a per offender 105, or per group of offenders basis. In such a configuration an offender 105 can be allowed to authenticate their arrival time or return time late without triggering an alert. In one or more embodiments, the allowance can be granted to an offender 105 that has few, no, or only certain restrictions (e.g., compliance monitoring rules associated with the offender 105) or offenders in good standing.

A record of a late compliance monitor check can be recorded even if no alert is created. The record can include the time the personnel 107 authenticate offender 105 location. The record can include an indication of how late the personnel 107 were in authenticating the arrival or return of the offender 105. The system can notify one or more specified users in response to an offender 105 arriving at a destination. The notification (e.g., message) can include the date or time of arrival, a unique ID associated with the offender 105 or RFID TX/RX 102, or other information pertinent to the arrival of the offender 105.

If an RFID TX/RX 102 becomes inoperable (e.g., because it failed or the offender damaged it either intentionally or unintentionally or lost it) the arrival time or return time can be manually entered into the system, such as through server 108 or the UI 106. The record associated with such an authentication can include an indication that the authentication was done manually or the reason the authentication was done manually.

A compliance monitor event 220 can be associated with more than one RFID TX/RX 102. For example, in the example of doing a head count in a secure facility a compliance monitor event 220 can trigger an alert to the UI 106 indicating to determine the number of offenders in their cell, housing unit, or some other location, such as an infirmary or recreation yard. Associating a compliance monitor event 220 with an RFID TX/RX 102 can be done automatically, such as by a computer processor, or can be done manually by a user through an application configured to manage the configuration and implementation of a compliance monitor system. The server 108A or 108B can instruct, or poll, the RFID TX/RX 102A-102F for collected data or the RFID TX/RX 102A-F can be programmed to send the collected data to the server 108A-108B or the service 216. The data can be sent as soon as the data is collected, on a pre-determined schedule, or a combination thereof.

One or more of the RFID TX/RX 102A-102F can be configured to constantly or intermittently monitor for a nearby RFID TX/RX 102 (e.g., a passing RFID TX/RX 102 or a RFID TX/RX 102 that has moved within range of the RFID TX/RX 104). Such RFID TX/RX 102 can be helpful in monitoring areas where RFID TX/RX 102 are not expected to be or in monitoring transit points to monitor the progress of offenders 105 in transit. When one of these RFID TX/RX 102 detects the presence of another RFID TX/RX 102, an alarm or message can be sent to the proper personnel, such as through the server 108 or the network 213. The message or alert can be a text, or other content, message to a mobile device, an email (e.g., including an attachment), or other notification.

The data sent from the RFID TX/RX 102A-102F to the server 108 can be encrypted. The data from the RFID TX/RX 102 can be sent to a server 108 that is running middleware 224 (e.g., software that provides services to a software application beyond those available from an operating system or an application that logically and physically runs between a sender and a receiver).

In one or more embodiments, rather than using middleware 224 or calling one or more services 216 (e.g., services provided over the internet or through the network 213 with or without the internet), the RFID TX/RX 102 can include one or more services, which may be in the form of an application programming interface (API), database connectivity client, or other logical element to perform the functions of the middleware 224 or the service 216. An example of an RFID TX/RX 102 that can be used to perform the functions of the middleware or the service 216 is the FX7400 RFID TX/RX from Motorola, Inc. of Schaumburg, Ill.

The RFID TX/RX 102E can include a screen configured to display information related to scanning a RFID TX/RX 102. The RFID TX/RX 102E can be configured to display, such as on UI 106 a schedule to a user indicating when or where RFID TX/RX 102E scans are to occur. The schedule can be retrieved from the database 214 or the scheduling module 211.

A compliance monitoring rule 222 can include that the personnel 107 are to perform a location check on an offender periodically (e.g., every half hour), feed an offender 105 at a specified time, transport an offender 105 to another part of the secure facility at a specified time, transport an offender to a job or back to their cell at a specified time, provide healthcare to an offender 105 at a specified time, or the like. When the service 216 determines that the personnel has complied with the compliance monitoring rule 222 or failed to comply with the compliance monitoring rule 222, the service 216 can provide an indication of the same on the UI 106.

The RFID TX/RX 102 can transmit a unique identifying signal that is recognizable by another RFID TX/RX 102. In one or more embodiments, the RFID TX/RX 102 can emit the identifying signal in response to a signal sent from the other RFID TX/RX 102. The RFID TX/RX 102 can be incorporated into a bracelet, a chip configured to be embedded in clothing, an implantable device, an identification card, a mobile device or may take some other form that allows the RFID TX/RX 102 to travel with personnel 107 or be mounted on the secure facility. The RFID TX/RX 102 can be assigned to an individual offender 105, personnel 107 at the secure facility, a location at the secure facility, or the like. In a system that includes a RFID TX/RX 102 associated with an entity at the secure facility, the system can detect when the entity (e.g., a detention center personnel 107), is near an offender 105 by way of location information stored with the RFID TX/RX 102.

The server 108 can be configured to run a web application 210 or middleware 224 configured to implement or manage personnel 107 compliance. The server 108 can receive data from the RFID TX/RX 102A-102F. The data received can include a unique identification (ID) key that identifies the RFID TX/RX 102A-102F that sent the data. The server 108 can look up the RFID TX/RX ID and correlate a specific time or location with the RFID TX/RX 102A-102F. The server 108 can send the time, location, and RFID ID data to another server 108B, such as at a data center 218.

The server 108 can be part of a Local Area Network (LAN), or it can be hosted remotely. The middleware 224 that can be accessible through the server 108 can either be hosted locally (e.g., through a LAN) or remotely. The middleware 224 can send data received or modified by the server 108 or middleware 224 to a service 216.

Figure 2:
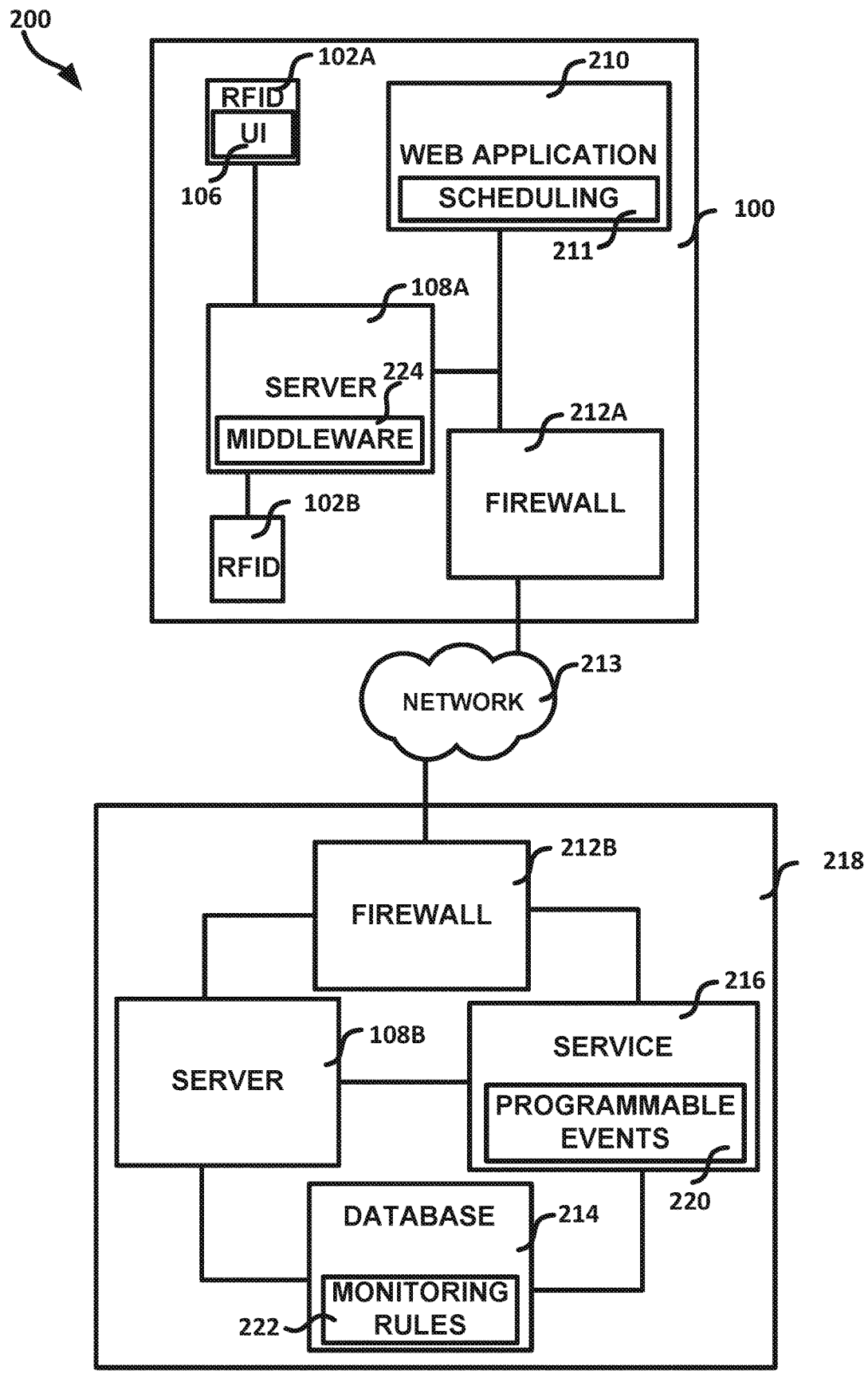
FIG. 2 illustrates an example of a networked system for automated compliance monitoring, according to an example embodiment.

FIG. 2 illustrates an example of a networked system 200 for automated compliance monitoring. The networked system can include the RFID TX/RX 102A-102B the server 108A, a web application 210, or a firewall 212A. The RFID TX/RX can be coupled to the server 108A such that data can be sent to the server 108A from the RFID TX/RX 102A-102B and data can be sent to the RFID TX/RX 102A-102B from the server 108A. The server 108A can be coupled to the web application 210, such as to host the web application 210. The server 108A can be coupled to the firewall 212A so data sent from and received at the system 100 can be protection scanned, encrypted, or decrypted.

While the server 108B, service 216, and the database 214 are depicted as individual units, they may be implemented on one or more servers. For example, the server 108B, service 216, and database may all be implemented on the same server, or each may be implemented on its own server.

The web application 210 can render web pages that can provide the functionality of the service 216 to a user. The web application can be hosted locally, such as on server 108A, or remotely, such as on server 108B.

The networked system can include the system 100 coupled to the data center 218, such as through a network 213 (e.g., the internet). Such a configuration can allow the data storage for and analysis of monitoring RFID TX/RX 102 and RFID TX/RX 102 interactions to be off site. The data center 218 can include a firewall 212B coupled to a server 108B and a service 216, such that the firewall 212B can help to ensure that the data sent to the server 108B and the service 216 will not harm the server 108B or service 216. The server 108B can be coupled to a database 214, such that the database 214 can provide data to the server and receive data from the server 108B. The server 108B can be coupled to the service 216, such that the service 216 can provide functionality related to personnel compliance monitoring to the server 108B. The data received at the server 108B can be used in rendering web pages to users. The database 214 can be coupled to the service 216 to provide data to the service 216 and to receive and store the results of operations performed by the service 216.

The firewalls 212A-212B can scan incoming and outgoing data for malware to help reduce the chances of a malicious attack on the system 200. The firewall 212A can encrypt data that is outgoing or decrypt data that is incoming. The encryption or decryption can be accomplished using a separate encryption or decryption module and can be incorporated at different places in the system such as on an RFID TX/RX 102, so as to allow encrypted data sent to be sent to the server 108B.

The service 216 can be deployed locally on the server 108B or hosted remotely. The service 216 can retrieve compliance monitor events 220 currently assigned to an RFID TX/RX 102. The compliance monitor events 220 can be stored in the database 214, on the server 108A-108B, or on the service 216. The service 216 can run processes associated with a compliance monitor event 220. For example, the service 216 can analyze, organize, or format collected data. The analyzed, organized, or collected data can be sent to the database 214 for retention. The analysis can include comparing the data to monitoring rules 222 associated with a compliance monitor event 220. Such comparisons can monitor compliance and detect violations of the monitoring rules 222 and an alarm, alert, or message can be sent to the proper personnel when a monitoring rule 222 has been violated.

The service 216 can correlate collected data. A correlation of data can help the service 216 detect a violation of a monitoring rule 222. A correlation can be performed at an individual personnel level, a block level, an entire building (e.g., secure facility, such as a detention center, mental health facility, or the like) level, or other level. For example, the service 216 can correlate all data associated with the same personnel 107 and compare that data to the monitoring rules 222 relating to the personnel to determine if the personnel complied with the monitoring rule 222 or a violation has occurred. The service 216 can compare one personnel's data to another personnel's data to determine if a monitoring rule 222 violation has occurred. Such comparisons can be useful when a monitoring rule 222 states that two or more personnel are to perform a check on an offender. The service 216 can be hosted locally (as shown) or can be hosted on the network 213 (e.g., cloud).

The service 216 can receive and process data from the middleware 224. The processing can include authenticating a customer name. Authenticating a customer name can be done by verifying a customer's port number in examples where a customer has been assigned a unique port number. Authenticating can also include verifying RFID TX/RX 102A-102F ID information and RFID TX/RX 102A-D ID information received is consistent and assigned to that customer. A user (e.g., an end user) can automate the running of compliance monitor events 220 through scheduling them through the service 216. A user can manually trigger a compliance monitor event 220 for the service 216 to execute. The user can customize the operations performed by the service 216 in running a compliance monitor event 220, such as through the server 108A-108B or web application. The service 216 can compare data received to monitoring rules 222 and determine if a monitoring has been violated. The service can initiate an alert process in response to determining that a rule has been violated.

The database 214 can store monitoring rules 222 therein. The monitoring rules 222 can define the relationship between or validate the performance expectations between a compliance monitor event 220 and a RFID TX/RX 102. This can include cross-referencing other monitoring rules 222 (e.g., restrictions or requirements) associated with a given RFID TX/RX 102. For example, some personnel 107 can be prohibited from providing healthcare, while other personnel 107 can be prohibited from performing offender 105 location checks. The rule or restriction could be for punitive reasons, health concerns, safety concerns, or the like. The monitoring rule 222 can have an associated duration in which the monitoring is valid and is to be referenced by the service 216. One or more monitoring rules 222 can be associated with a specific offender 105 or personnel 107 such that when the offender 105 or personnel 107 is no longer in the building, the monitoring rule 222 is no longer referenced by the service 216.

The service 216 can analyze the data received from the RFID TX/RX 102A-102F and compare the received data to relevant monitoring rules 222 to determine if an alert or message should be sent to the relevant personnel, via a mobile RFID TX/RX 102 or another compute device. If no violation is detected the service 216 can initiate a sequence of operations (e.g., a pre-programmed sequence of operations, processes, or events) to complete. For example, the service 216 can look for a violation of a user defined compliance rule (e.g., an offender location check is to occur every half hour). The service 216 can then search for violations of monitoring rules (e.g., a location check was not performed). The service 216 can then continue to perform another process (e.g., a user defined process), such as documenting the compliance of personnel 107. Future data received can be analyzed (e.g., compared to monitoring rules 222) in real-time to determine if an alert or message is to be sent. When the analysis is complete, the service 216 can record that the analysis was completed in the database 214.

In the case of an Internet failure (e.g., the Internet is temporarily unavailable) the middleware 224 can be configured to store received data in a local memory. When Internet connectivity is restored, the received data can be sent to the service 216. Such a configuration can be helpful in embodiments that include Software as a Service (SaaS) or a remotely hosted server. The middleware 224 can be configured to determine if a monitoring rule 222 has been violated, such as when the Internet connection to the service has failed. In one or more embodiments, the middleware 224 includes a subset of all the monitoring rules 222 for a specific system. These monitoring rules 222 can be the most important rules (e.g., the rules that the user does not want violated). In one or more embodiments, the service 216 can determine if a monitoring rule 222 has been violated after it has received the relevant data.

The middleware 224 can reside on the server 108A or 108B, locally or remotely, respectively. In one or more embodiments, the middleware 224 can be hosted in a network 213 (e.g., cloud) server. Such an implementation can provide automated personnel 107 compliance monitoring to a user through a Software as a Service (SaaS) configuration. The middleware 224 can provide communication between the RFID TX/RX 102A-102F and the data center 218. The middleware 224 can be configured to encrypt data it receives from the RFID TX/RX 102A-F and send the encrypted data to the service 216, server 108B, or the database 214.

The database 214 can store data from the RFID TX/RX 102A-102B, the service 216, the web application 210, or the server 108A-B.

Figure 3:
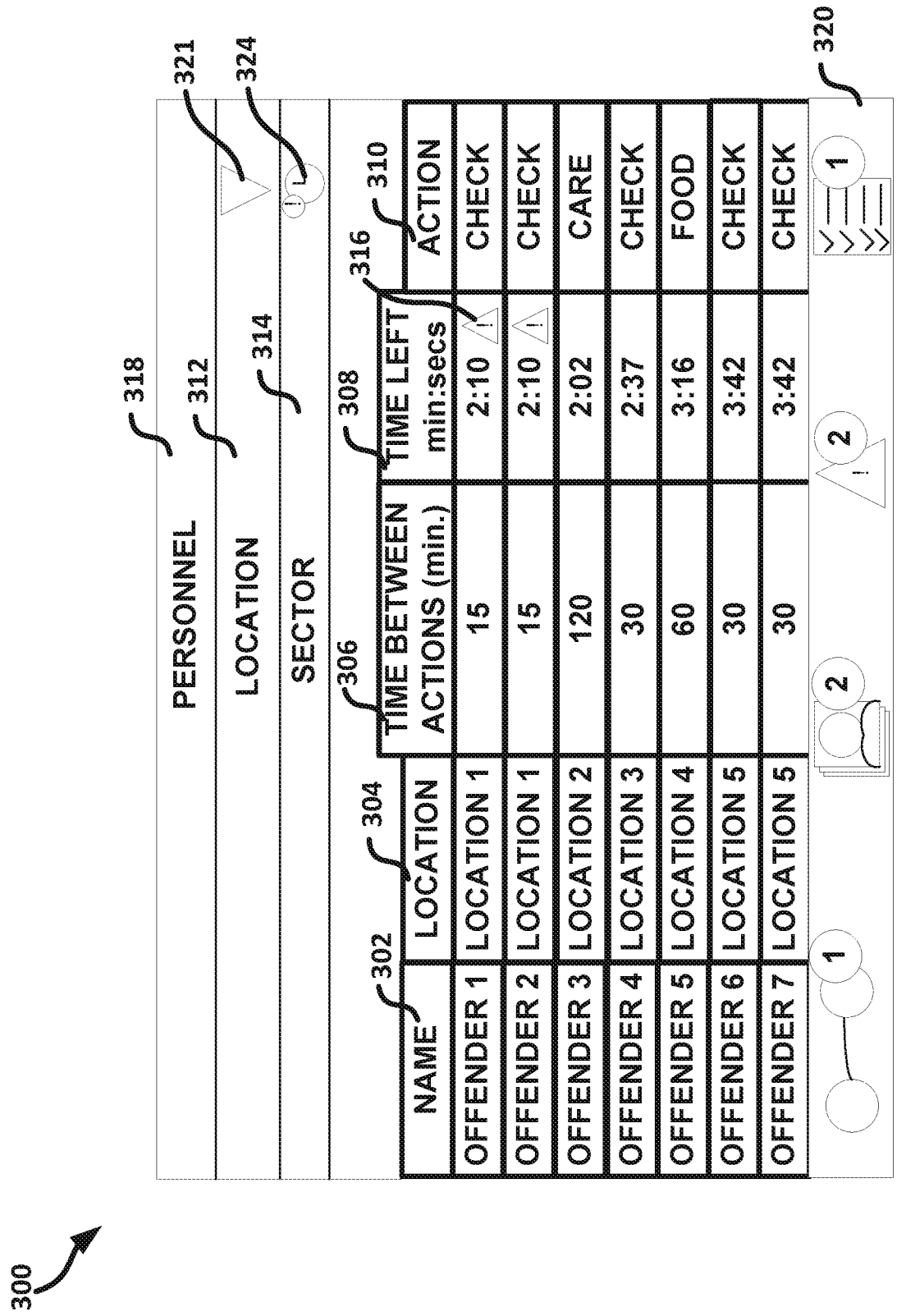
FIG. 3 illustrates a user interface, according to an example embodiment.

FIG. 3 illustrates a user interface 300, according to an example embodiment. The user interface 300 can include information pertinent to compliance monitoring. User interface 106 can be substantially similar to user interface 300. The user interface 300 can include information such as the names 302 or unique IDs of respective offenders 105 in a secure facility. The user interface 300 can show a last known offender location 304 of the offender 105.

That compliance monitoring information can include a time between actions 306. The time between actions indicates a maximum amount of time allowed between a prior action regarding an offender 105 and a next action regarding the same offender 105. The compliance monitoring information can include a time left 308. The time left 308 can indicate how much of the time indicated by the time between actions 306 remains. The action 310 can indicate the operation to be performed in satisfying the compliance issue associated with the offender 105.

A late action indicator 316 can indicate that the action is beyond the time between actions 306. If a late action indicator 316 is present, that means an action associated with a compliance rule is beyond the time indicated by the time between actions 306. In response to the time left 308 expiring, the time indicated by the time between actions 306 can change and the time left 308 can be reset to the time between actions 306 and begin counting down.

An entry can be changed to a different color, pattern, or the like, a device can vibrate, a sound can be made, or a combination thereof, in response to the time left expiring. An entry is a row of data of the UI 300 as illustrated in FIG. 3. The color or pattern change can help readily indicate to the personnel 107 the most important action (in terms of amount of time overdue). The UI 300 can be sorted to include the compliance checks in temporal order. The temporal order can include one or more of (1) checks most overdue and (2) checks coming due (e.g., in that order and in terms of time remaining on the time left 308).

Note that not all personnel are authorized to perform a particular action 310. The actions 310 can be filtered by the web application 210, the server 108A, 108B, middleware 224, service 216, or the like. The filter can send only actions to the RFID TX/RX of the personnel 107 for which the personnel 107 are authorized to perform. The database 214 can store data including a unique ID 318 that identifies a specific personnel 107 and corresponding actions that the personnel 107 are authorized to perform. The actions can include an associated personnel location 312, sector 314, offender name (or other identification) 302, offender location 304, action 310, a combination thereof, or the like. The data displayed on the UI can be determined based on the compliance monitoring rules 222.

The UI 300 can include one or more notifications 320. The notifications 320 can indicate to the personnel 107 how many actions associated with compliance monitoring are overdue, how many offenders are associated with the actions that are overdue, or the like.

The personnel 107 can select a different personnel location 312 using a location dropdown software control 321. The user can select the software control 321 to change what data is populated in the offender location 304. In some embodiments, the personnel location 312 and sector 314 can be changed in response to the personnel 107 being scanned by another RFID TX/RX 102. The personnel location 312 and sector 314, in such embodiments, can be updated to the location of the RFID TX/RX 102 scan.

A late action justification icon 324 can be provided if the corresponding sector 314 has an action that is being monitored for compliance that is overdue. In response to the personnel 107 performing an action that is being monitored for compliance and is overdue, a view provided by the user interface 600 (see FIG. 6) can be provided on the RFID TX/RX 102.

FIG. 4 illustrates a diagram of another embodiment of a user interface 400. The view provided by the user interface 400 can be provided by the user interface 106, such as in response to a user selecting a software control provided on the user interface 106 (e.g., a software control of one of the notifications 320, such as a compliance monitor software control).

The view provided by the user interface 400 includes a subset of the items in the view provided by the user interface 300. The items provided include the personnel 318, personnel location 312, sector 314, offender location 304, time between actions 306, time left 308, and the notifications 320.

In response to the user selecting the offender location 304, swiping up, down, left, or right on the user interface 400, issuing an audio command, or the like, the view provided on the user interface 400 can be changed to a view provided on the user interface 500.

The offender location 304 or the offender name 302 can be associated with a special status indicator 322. The special status indicator 322 can indicate whether the offender name 302 or an offender in the offender location 304 is on suicide watch, chemical watch, or otherwise requires special care.

Figure 5:
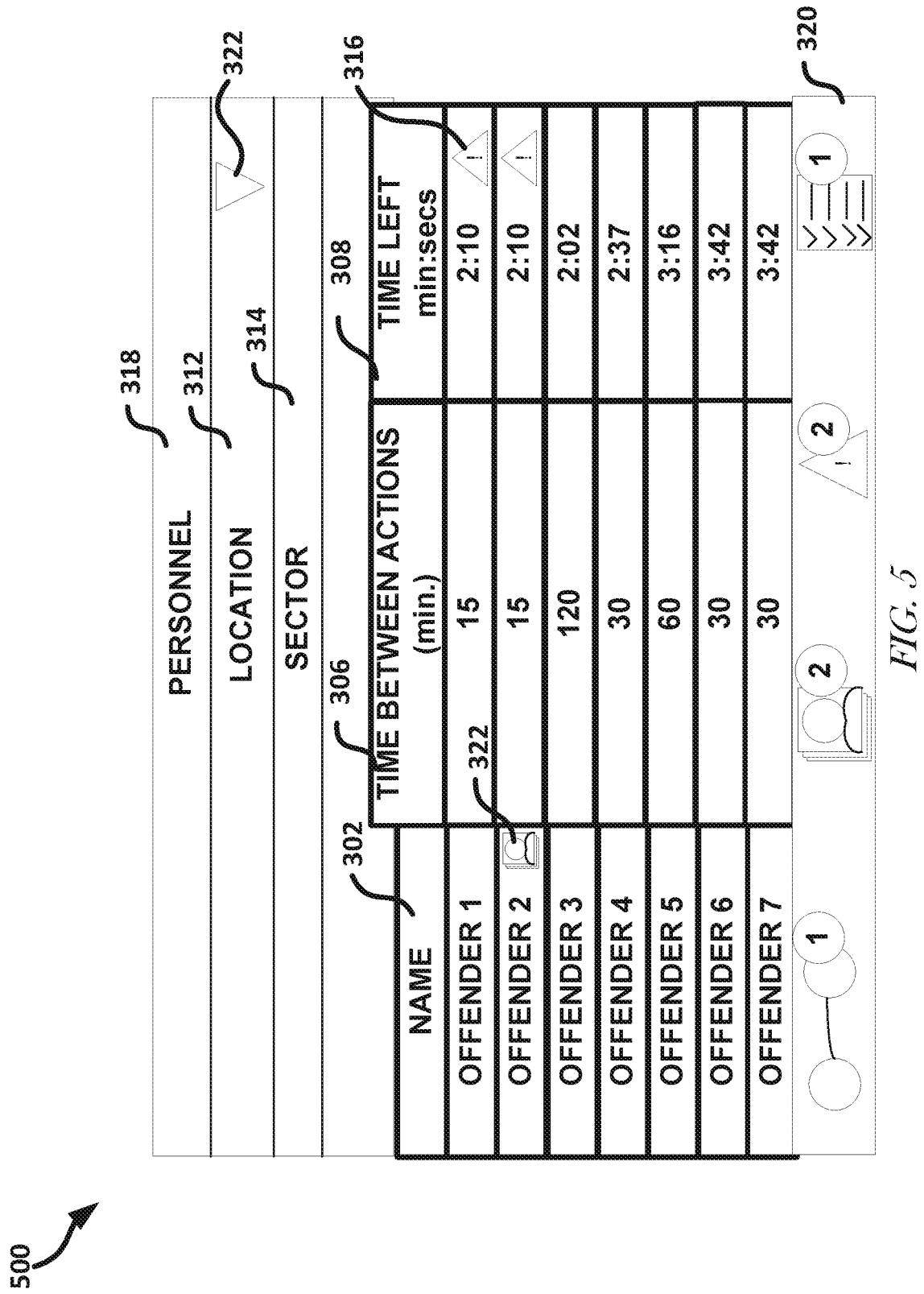
FIG. 5 illustrates a diagram of another embodiment of a user interface, according to an example embodiment.

FIG. 5 illustrates a diagram of another embodiment of a user interface 500. The user interface, as discussed, can be presented in response to selecting the offender location 304, swiping up, down, left, or right on the user interface 400, issuing an audio command, or the like. The user interface 500 is similar to the user interface 500 with the offender names 302 in the place of the offender location 304. The personnel 318, personnel location 312, sector 314, and notifications 320 can persist and remain in the same location.

FIG. 6 illustrates a diagram of another embodiment of another user interface 600. The view provided by the user interface 600 can be provided by the user interface 106. To clear an action associated with a compliance check, an RFID TX/RX 102 associated with the location of the offender 105 can detect the RFID TX/RX 102E of the personnel 107. The personnel 107 can then select the offender name 302 or offender location 304, or other portion of the entry associated with the compliance check. The user interface 600 can be displayed in response to the personnel 107 selecting an action associated with an overdue compliance check. The user interface 600 as illustrated includes an input box 660 in which the personnel 107 can provide a description of why the action associated with a compliance rule was not performed within the time required by the compliance rule. A violation ID 662, personnel ID, the text entered into the input box 660, or the like can be stored with a record of the failed compliance check in the database 214. These items can be sent to the database 214, such as in response to the personnel selecting a save software control 662 on the user interface 600.

An entry in the input box 660 can be cached (e.g., locally). The cached input can be automatically populated on the user interface 600 in subsequent scans that match some criteria. The criteria can include one or more of (a) a same personnel location 312, (b) a same sector 314, (c) a same action, (d) a specified time from the last scan, or the like. This will allow the personnel 107 to not have to retype/speak the same information for their series of late scans when they are all late likely due to the same reason. The personnel 107 can clear cached input and override the automatic justification, such as by selecting a clear software control 664.

Figure 7:
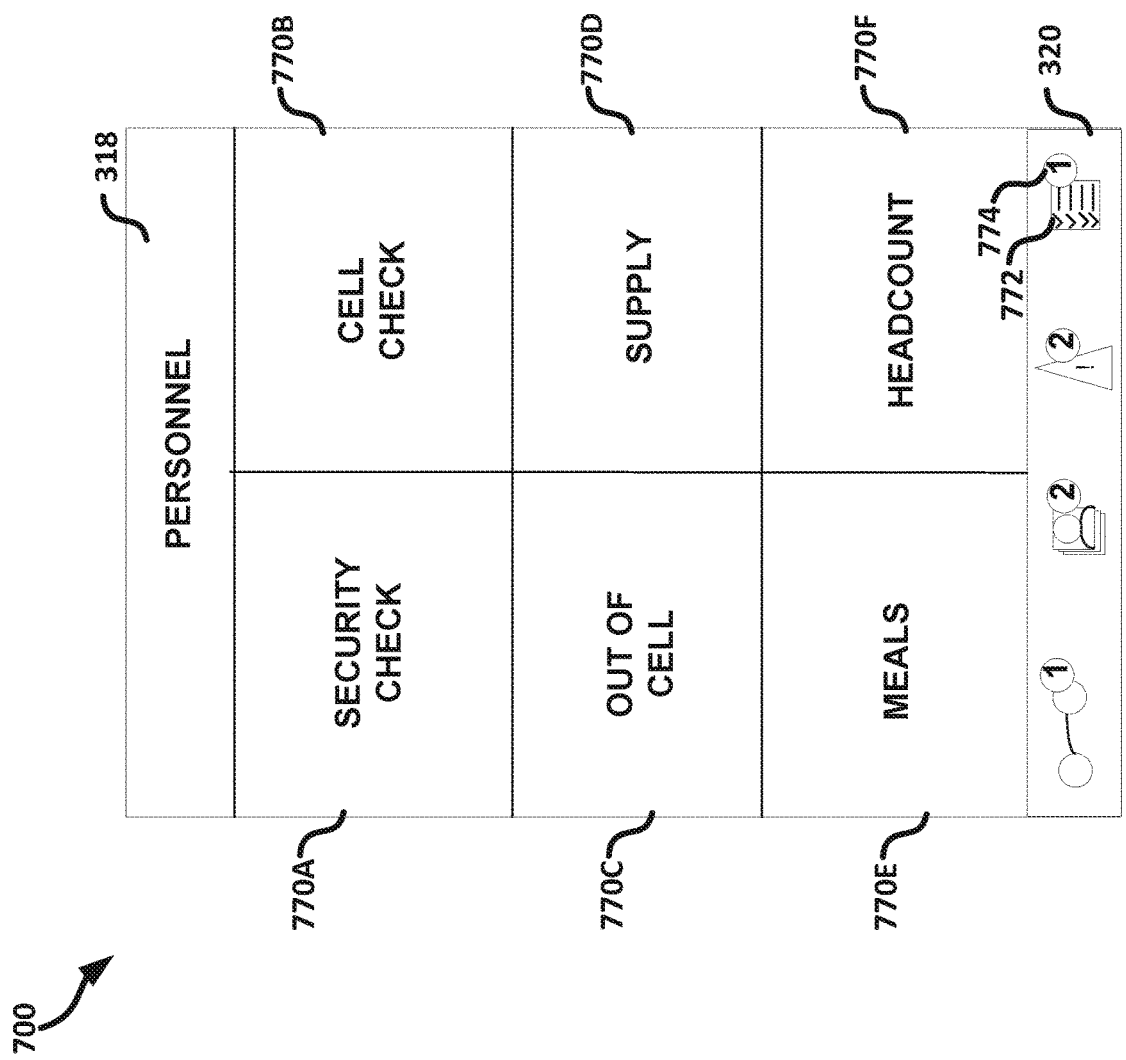
FIG. 7 illustrates a diagram of an example of a home screen view provided on a user interface, according to an example embodiment.

FIG. 7 illustrates a diagram of an example of a home screen view provided on a user interface 700. The view of the user interface 700 can be provided on the user interface 106. The home screen view can include selectable software controls 770A, 770B, 770C, 770D, 770E, 770F. The selectable software controls 770A-770F can provide a user a different view for managing an aspect of offender management or documentation. The aspects illustrated in FIG. 7 include a security check, cell check, out of cell, supply, meals, and headcount. The user interface 700 includes the personnel 318 and the notifications 320 in the same place on the user interface as they are in the user interfaces of FIGS. 3-5.

One of the user interfaces of FIGS. 3-5 can be displayed in response to the selecting a compliance monitor notification 772 or the security check software control 770A. In some embodiments, a view provided by the user interface 400 of FIG. 4 (sometimes called a location roster) can be displayed in response to the user selecting the compliance monitor notification 772 or the security check software control 770A. Note that the view provided by the user interface 500 of FIG. 5 is sometimes called an offender roster. As used herein, a user selection can include, for example, a touch of a software control on a user interface that is a touch screen, speaking a command into a microphone, dwelling on a software control (e.g., with a vision tracking application), clicking a mouse while a cursor hovers over the software control, or the like.

A numeric indicator 774 near the notification 772 indicates how many actions are cause for concern and related to the notification. In the example of the compliance monitor notification 772, the numeric indicator 774 can indicate the number of actions that are currently out of compliance. In response to proper personnel 107 being detected at the location associated with the action and the personnel 107 verifying, through a user interface, that an offender 105 is present or an action was taken, the numeric indicator 774 can be decremented. In response to an action that is being monitored for compliance becoming overdue (the time left 308 expiring) the numeric indicator 774 can be incremented.

In response to the personnel 107 selecting the cell check software control 770B, it can function as if the RFID TX/RX 102 were scanned. The software control 770B can allow the personnel 107 to continue to operate even if another RFID TX/RX 102 is inoperable or the personnel 107 cannot make the scan, for whatever reason.

FIG. 8 illustrates a diagram of an embodiment of a user interface 800 through which the personnel 107 can manage information provided in response to selecting the compliance monitor notification 772 or the security check software control 770A. The personnel 107 can select options 886 that alter how the compliance monitor information is presented. The personnel 107 can filter the compliance monitor alerts based on location 884. The location 884 can be set to the location or locations for which the personnel 107 are responsible for one or more actions that are being monitored for compliance. The options 886 can allow the personnel 107 to view more or less information or receive fewer or more different indications regarding the action that subject to compliance monitoring. The options can include showing location that are past due or due within a specified amount of time, show out of cell locations (the offender location 304 can display locations of the offender 105 other than the offender's cell if the offender 105 is not in their cell), show non-offender locations (e.g., other security offices, medical personnel, cooks, etc., administrative staff, or the like of the secure facility), provide a warning that is acoustic, a mechanical vibration, optical, or a combination thereof a specified time before an action being monitored for compliance is due, or the like.

Selections by the user on the user interface 800 can alter the data provided on the user interface 300. The user interface 106 can be changed in accord with the option 886 selections of the personnel 107. The personnel 107 can cause the selections to be stored for future population of the user interface 106 by selecting the acknowledge software control 880.

Figure 9:
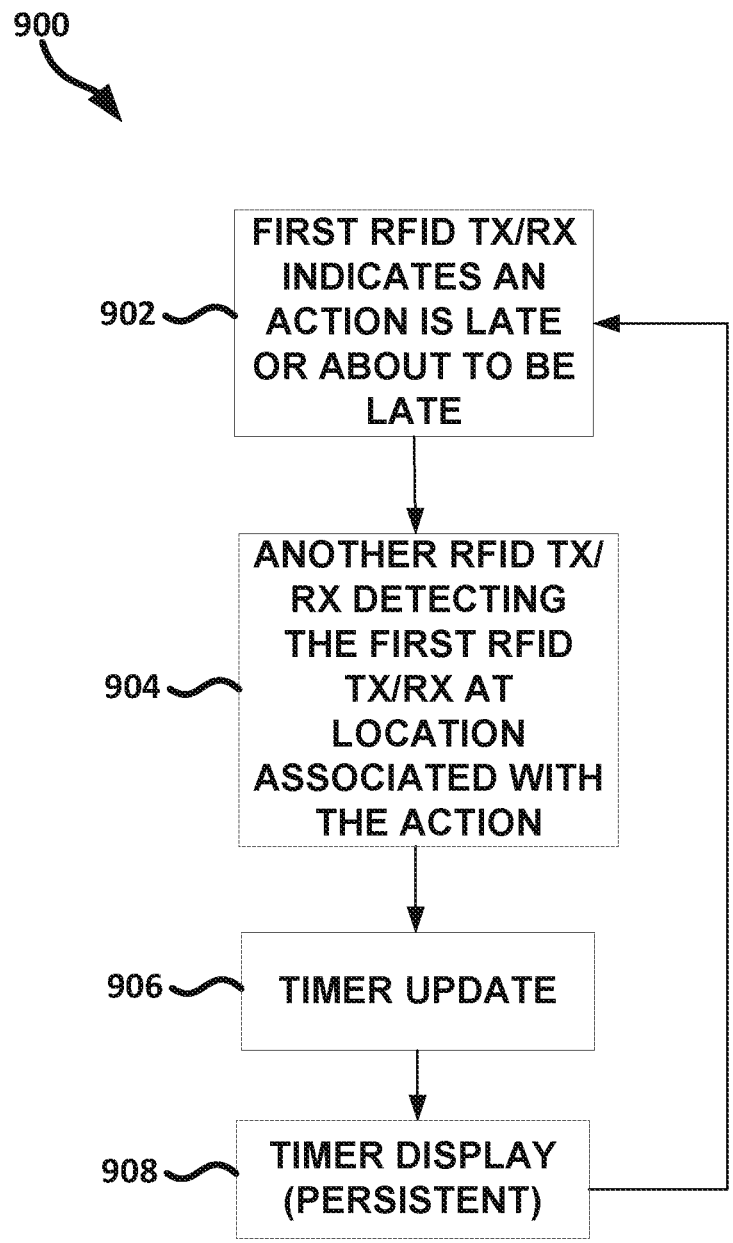
FIG. 9 illustrates a flow diagram of a method for compliance monitoring of personnel at a secure facility, according to an example embodiment.

FIG. 9 illustrates a flow diagram of a method 900 for compliance monitoring of personnel 107 at a secure facility. The method 900 as illustrated includes a first RFID TX/RX 102E providing, by the user interface 106, an indication that an action subject to compliance monitoring is late or is about to be later, at operation 902; another RFID TX/RX 102 detecting the first RFID TX/RX 102E at a location associated with the action, at operation 904; updating a time to next action, at operation 906; and displaying the updated timer (on the first RFID TX/RX 102E), at operation 908. The operation 904 can alternatively include the personnel 107 manually entering data, into the RFID TX/RX 102E, indicating that the action subject to compliance monitoring was performed. The operation 902 can include a server providing data to the RFID TX/RX indicating that the action is late or about to be late.

The another RFID TX/RX 102 of operation 904 can be near a cell of an offender 105 associated with the action. The another RFID TX/RX 102 of operation 904 can be at a location associated with the action. The operation 906 can be performed in response to (a) the operation 904, (b) personnel confirming, through the user interface 106, that the action has been performed, or a combination thereof. The timer display of operation 908 can be persistent through the method 900 or can be displayed upon request of personnel 107 or in response to an action being late or within a specified amount of time of being late.

Figure 10:
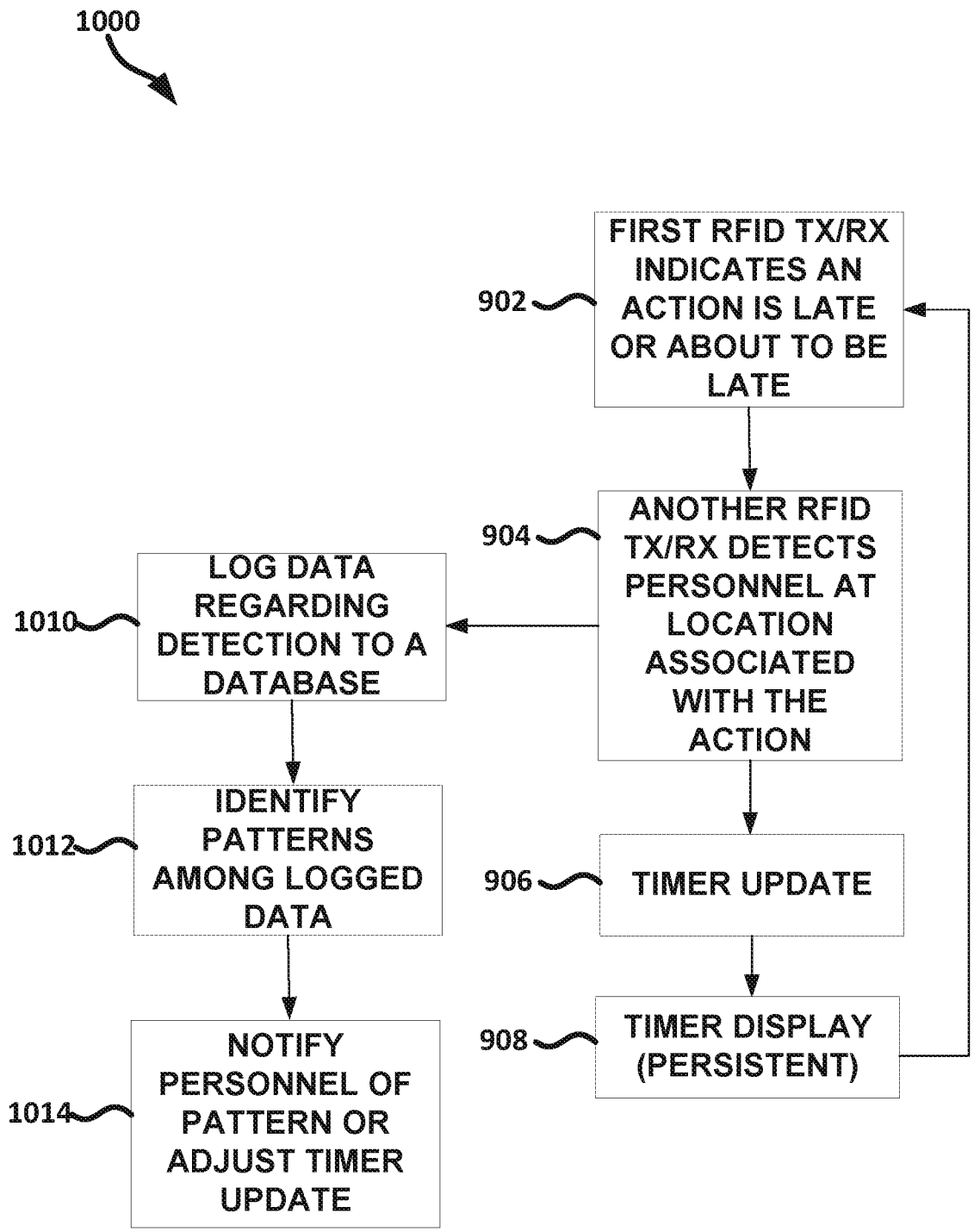
FIG. 10 illustrates a flow diagram of another method for compliance monitoring of personnel at a secure facility, according to an example embodiment.

FIG. 10 illustrates a flow diagram of another method 1000 for compliance monitoring of personnel 107 at a secure facility. The method 1000 includes the method 900 of FIG. 9 with additional operations. The additional operations can help personnel 107 of the secure facility realize their habits. The additional operations can help personnel 107 overcome their habits so that an offender 105 does not realize and take advantage of their habits.

The additional operations of FIG. 10 can include logging data regarding detection to the database 214, at operation 1010; identifying patterns among the logged data, at operation 1012; and notifying personnel of the pattern or adjusting the timer update (of operation 906), at operation 1014.

The data logged at operation 1010 can include a time between actions, a time an action was performed, the action, the location, an offender name or other identification, a personnel name or other identification, a combination thereof, or the like. The operation 1012 can include manual review of the logs, machine learning, heuristic analysis (automatic, such as without human interference after deployment), or the like. The operation 1012 can include determining an average or other mean, standard deviation, variance, or other measure of variation, or the like among like logged data. Like logged data can include a similarity (same personnel, same offender, same location, same action, a combination thereof, or the like). The like data can be different in some way (e.g., performed on a different day, a different time of day, different personnel, different offender, different location, or the like). Patterns with variation below a threshold can be troublesome, as an offender 105 can become aware of the pattern and take advantage of the pattern. If the offender 105 determines, for example, that the personnel 107 performs a cell check almost exactly every 30 minutes, the offender 105 can covertly perform acts in their cell while complying with the personnel 107 cell check. The cell check will then not be as much of a deterrent as it could be.

The operation 1014 can help teach personnel of their habits. The notification of operation 1014 can be provided on the RFID TX/RX 102 associated with the personnel (e.g., that the personnel 107 is logged into). The operation 1014 can include adjusting the timer update of the operation 906 to provide an alert to the personnel 107 at a different interval that satisfies the action being monitored for compliance and changes the variation of the action.

Figure 11:
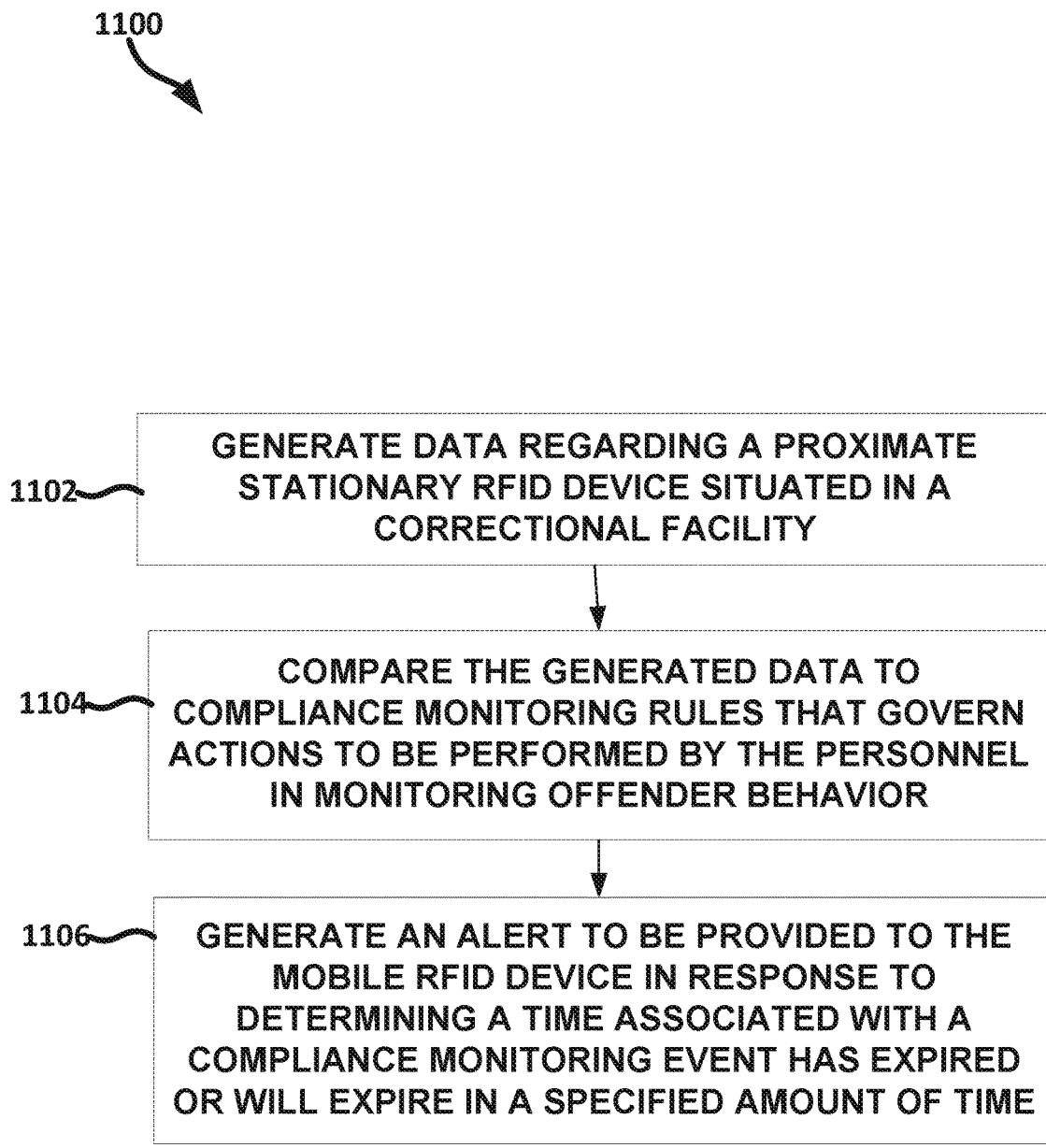
FIG. 11 illustrates a flow diagram of another method for compliance monitoring of personnel at a correctional facility, according to an example embodiment.

FIG. 11 illustrates a flow diagram of another method for compliance monitoring of personnel at a correctional facility, according to an example embodiment. The method 1100 as illustrated includes generating, by a mobile radio frequency identification (RFID) device, data regarding a proximate stationary RFID device of stationary RFID devices situated about a correctional facility, the mobile RFID device associated with a user, at operation 1102; and comparing, by a server, the generated data to compliance monitoring rules that govern actions to be performed by the personnel in monitoring offender behavior, each of the compliance monitoring rules including an associated timeframe in which an action of the compliance monitoring rule is to be performed, qt operation 1104; and generating, by the server, an alert to be provided to the mobile RFID device in response to determining a time associated with a compliance monitoring action has already expired or will expire in a specified amount of time, at operation 1106.

The method 1100 can further include, wherein the generated data includes an identification indicating the user, a time the mobile RFID device was proximate the stationary RFID device, a location associated with the stationary RFID device, an offender associated with the location, and an indication that the user verified the action using the mobile stationary RFID device. The method 1100 can further include logging, by the server, the generated data over time and adjusts the specified amount of time based on the logged data. The method 1100 can further include, wherein adjusting the specified amount of time includes determining a variation in times between repeated actions of the user and varying the specified amount of time to be within the time associated with the compliance monitoring rule and increasing the variation in times between repeated actions.

The method 1100 can further include providing, by a user interface of the mobile RFID device, a view of a notification indicating whether the time has expired or will expire in the specified amount of time. The method 1100 can further include, wherein the specified amount of time is user-specified. The method 1100 can further include, wherein the user is one of multiple users, wherein the notification persists until an authorized user of the users of the system performs the action associated with the compliance monitoring rule.

The method 1100 can further include receiving, by the user interface and from the authorized user, a justification in response to the authorized user attempting to perform the action associated with the notification. The method 1100 can further include automatically populating, by the user interface, an input box thereof with the justification in response to the authorized user attempting to perform an action associated with another notification within a specified amount of time.

The method 1100 can include identifying that a status associated with an offender has changed. The method 1100 can include determining if a time to perform a compliance check is changed by the by the status change. In response to a determination that the time to perform the compliance check has changed, altering a corresponding timer associated with the offender to reflect the time change. Then when the timer expires, or is about to expire, an alert can be provided to the proper correctional facility personnel.

Figure 12:
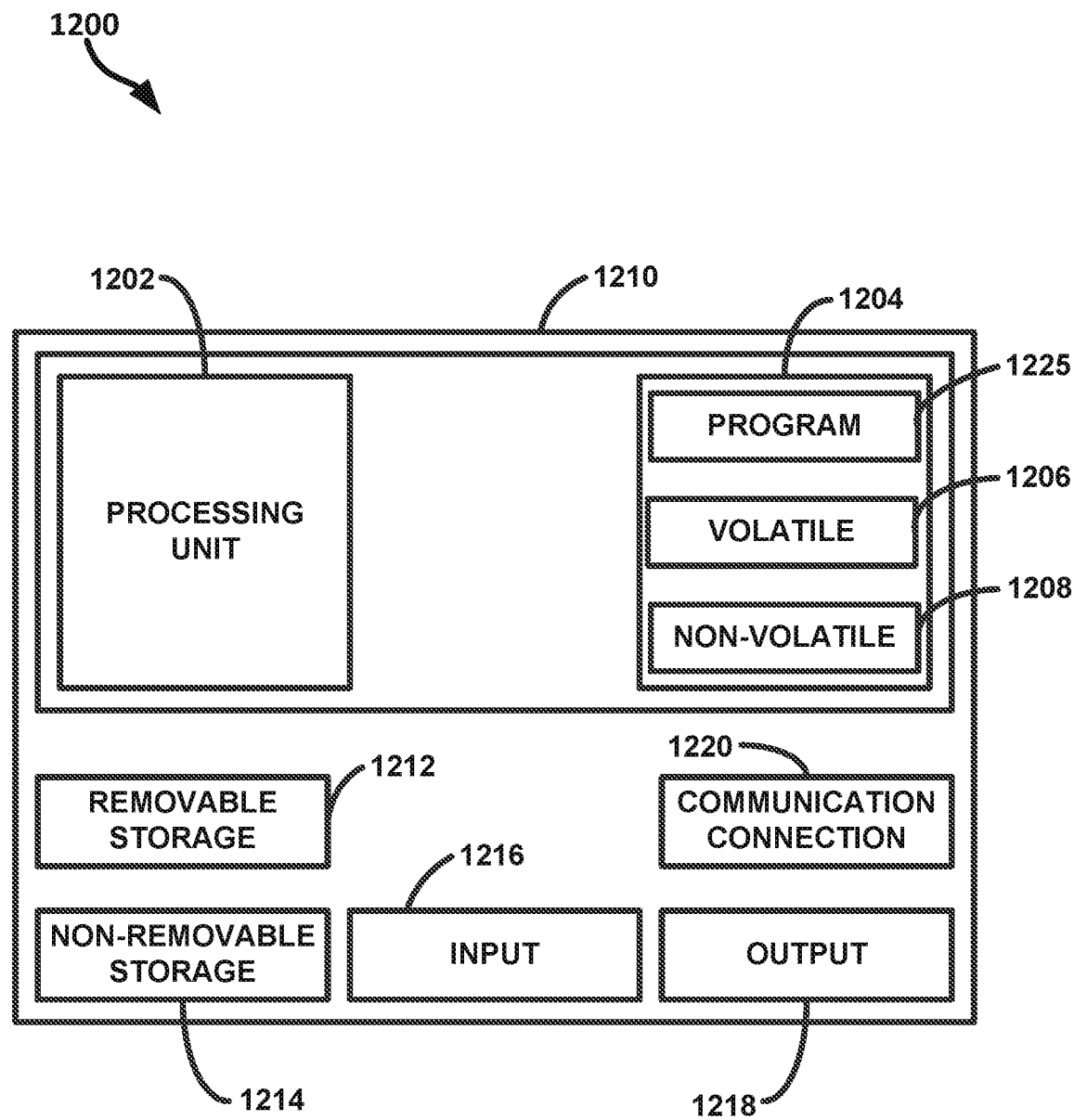
FIG. 12 is a block diagram of a computing device, according to an example embodiment.

FIG. 12 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 1210, may include a processing unit 1202, memory 1204, removable storage 1212, and non-removable storage 1214. Memory 1204 may include volatile memory 1206 and non-volatile memory 1208. Computer 1210 may include—or have access to a computing environment that includes—a variety of computer-readable media, such as volatile memory 1206 and non-volatile memory 1208, removable storage 1212 and non-removable storage 1214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1210 may include or have access to a computing environment that includes input 1216, output 1218, and a communication connection 1220. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1202 of the computer 1210. A hard drive, CD-ROM, and RAM are some examples of articles including a non-transitory computer-readable medium. For example, a computer program 1225 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 1210 to provide generic access controls in a COM based computer network system having multiple users and servers.

The functions or algorithms described herein are implemented in hardware, software, or a combination of software and hardware in some embodiments. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely embodiments. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flows are applicable to software, firmware, and hardware implementations.

Systems and methods of the present disclosure may be implemented on a mobile device as a mobile application, web-based application, on a desktop computer as a computer application, or a combination thereof. A mobile application may operate on a Smartphone, tablet computer, portable digital assistant (PDA), ruggedized mobile computer, or other mobile device. The mobile device may be connected to the Internet or network via Wi-Fi, Wide Area Network (WAN), cellular connection, WiMax, or any other type of wired or wireless method of networking connection. In some embodiments, a web-based application may be delivered as a software-as-a-service (SaaS) package (e.g. cloud-based embodiments) accessible via a device app, a web browser application, or other suitable application, depending on the particular embodiment.

ADDITIONAL NOTES AND SOME EXAMPLE EMBODIMENTS

Example 1 includes a system comprising a mobile radio frequency identification (RFID) device to generate data regarding a proximate stationary RFID device of stationary RFID devices situated about a correctional facility, the mobile RFID device associated with a user, and a server configured to compare the generated data to compliance monitoring rules that govern actions to be performed by the personnel, each of the compliance monitoring rules including an associated timeframe in which an action of the compliance monitoring rule is to be performed, and generate an alert to be provided to the mobile RFID device in response to determining a time associated with a compliance monitoring action has already expired or will expire in a specified amount of time.

In Example 2, Example 1 can further include, wherein the generated data includes an identification indicating the user, a time the mobile RFID device was proximate the stationary RFID device, a location associated with the stationary RFID device, an offender associated with the location, and an indication that the user verified the action using the mobile stationary RFID device.

In Example 3, at least one of Examples 1-2 can further include, wherein the server logs the generated data over time and adjusts the specified amount of time based on the logged data.

In Example 4, Example 3 can further include, wherein adjusting the specified amount of time includes determining a variation in times between repeated actions of the user and varying the specified amount of time to be within the time associated with the compliance monitoring rule and increasing the variation in times between repeated actions.

In Example 5, at least one of Examples 1-4 can further include, wherein the mobile RFID device includes a user interface that provides a view of a notification indicating whether the time has expired or will expire in the specified amount of time.

In Example 6, at least one of Examples 1-5 can further include, wherein the specified amount of time is user-specified.

In Example 7, at least one of Examples 1-6 can further include, wherein the user is one of multiple users of the system, wherein the notification persists until an authorized user of the users of the system performs the action associated with the compliance monitoring rule.

In Example 8, Example 7 can further include, wherein the user interface receives, from the authorized user, a justification in response to the authorized user attempting to perform the action associated with the notification.

In Example 9, Example 8 can further include, wherein the user interface automatically populates an input box thereof with the justification in response to the authorized user attempting to perform an action associated with another notification within a specified amount of time.

Example 10 can include a method for performing operations of the mobile RFID device, the server, other component, or a combination of components of at least one of Examples 1-9.

Example 11 can include a non-transitory machine-readable medium including instructions that, when executed by a machine, cause the machine to perform operations of Example 10.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system comprising:
a mobile radio frequency identification (RFID) device to generate data regarding a proximate stationary RFID device of stationary RFID devices situated about a correctional facility, the mobile RFID device associated with a user; and
a server configured to compare the generated data to compliance monitoring rules that govern actions to be performed by the user, each of the compliance monitoring rules including an associated timeframe in which an action of the compliance monitoring rule is to be performed, and generate an alert to be provided to the mobile RFID device in response to determining a time associated with a compliance monitoring action has already expired or will expire in a specified amount of time, the generated data includes an identification indicating the user, a time the mobile RFID device was proximate the stationary RFID device, a location associated with the stationary RFID device, an offender associated with the location, and an indication that the user verified the action using the mobile stationary RFID device.

2. The system of claim 1, wherein the server logs the generated data over time and adjusts the specified amount of time based on the logged data.

3. The system of claim 2, wherein adjusting the specified amount of time includes determining a variation in times between repeated actions of the user and varying the specified amount of time to be within the time associated with the compliance monitoring rule and increasing the variation in times between repeated actions.

4. The system of claim 1, wherein the mobile RFID device includes a user interface that provides a view of a notification indicating whether the time has expired or will expire in the specified amount of time.

5. The system of claim 4, wherein the specified amount of time is user-specified.

6. The system of claim 4, wherein the user is one of multiple users of the system, wherein the notification persists until an authorized user of the users of the system performs the action associated with the compliance monitoring rule.

7. The system of claim 6, wherein the user interface receives, from the authorized user, a justification in response to the authorized user attempting to perform the action associated with the notification.

8. The system of claim 7, wherein the user interface automatically populates an input box thereof with the justification in response to the authorized user attempting to perform an action associated with another notification within a specified amount of time.

9. A method comprising:
generating, by a mobile radio frequency identification (RFID) device, data regarding a proximate stationary RFID device of stationary RFID devices situated about a correctional facility, the mobile RFID device associated with a user;
logging, by a server, the generated data over time;
comparing, by the server, the generated data to compliance monitoring rules that govern actions to be performed by the user in monitoring offender behavior, each of the compliance monitoring rules including an associated timeframe in which an action of the compliance monitoring rule is to be performed;
generating, by the server, an alert to be provided to the mobile RFID device in response to determining a time associated with a compliance monitoring action has already expired or will expire in a specified amount of time; and
adjusting the specified amount of time based on the logged data.

10. The method of claim 9, wherein the generated data includes an identification indicating the user, a time the mobile RFID device was proximate the stationary RFID device, a location associated with the stationary RFID device, an offender associated with the location, and an indication that the user verified the action using the mobile stationary RFID device.

11. The method of claim 9, wherein adjusting the specified amount of time includes determining a variation in times between repeated actions of the user and varying the specified amount of time to be within the time associated with the compliance monitoring rule and increasing the variation in times between repeated actions.

12. The method of claim 9, further comprising providing, by a user interface of the mobile RFID device, a view of a notification indicating whether the time has expired or will expire in the specified amount of time.

13. The method of claim 12, wherein the specified amount of time is user-specified.

14. The method of claim 12, wherein the user is one of multiple users, wherein the notification persists until an authorized user of the users performs the action associated with the compliance monitoring rule.

15. The method of claim 14, further comprising receiving, by the user interface and from the authorized user, a justification in response to the authorized user attempting to perform the action associated with the notification.

16. The method of claim 15, further comprising automatically populating, by the user interface, an input box thereof with the justification in response to the authorized user attempting to perform an action associated with another notification within a specified amount of time.

17. A non-transitory machine-readable medium including instructions that, when executed by a machine, cause the machine to perform operations for compliance monitoring of personnel of a correctional facility, the operations comprising:

receiving data regarding a stationary RFID device of stationary RFID devices situated about a correctional facility that is proximate a mobile RFID device associated with a user;

comparing the received data to compliance monitoring rules that govern actions to be performed by the personnel in monitoring offender behavior, each of the compliance monitoring rules including an associated timeframe in which an action of the compliance monitoring rule is to be performed;

generating an alert to be provided to the mobile RFID device in response to determining a time associated with the action has already expired or will expire in a specified amount of time; and receiving, by a user interface and from the authorized user, a justification in response to the authorized user attempting to perform the action associated with the alert.

18. The non-transitory machine-readable medium of claim 17, wherein the operations further include:

logging the received data over time; and adjusting the specified amount of time based on the logged data, wherein adjusting the specified amount of time includes determining a variation in times between repeated actions of the user and varying the specified amount of time to be within the time associated with the compliance monitoring rule and increasing the variation in times between repeated actions.

* * * * *